United States Patent
Ayshford

(10) Patent No.: US 8,721,753 B2
(45) Date of Patent: May 13, 2014

(54) METHOD AND APPARATUS FOR AN AIR FILTER CARTRIDGE REPLACEMENT ASSEMBLY

(75) Inventor: Gordon Timothy Ayshford, Goldaming (GB)

(73) Assignee: BHA Altair, LLC, Franklin, TN (US)

( * ) Notice: Subject to any disclaimer, the term of this patent is extended or adjusted under 35 U.S.C. 154(b) by 914 days.

(21) Appl. No.: 12/777,635

(22) Filed: May 11, 2010

(65) Prior Publication Data

US 2011/0277441 A1    Nov. 17, 2011

(51) Int. Cl.
*B01D 46/00* (2006.01)

(52) U.S. Cl.
USPC ............. 55/385.1; 55/385.3; 55/422; 55/478; 55/480; 55/481; 55/506; 55/493

(58) Field of Classification Search
USPC ............ 55/493, 502, 506, 309, 312, DIG. 34; 96/420, 421, 134, 422; 60/264; 29/592.1, 888; 415/121.2
See application file for complete search history.

(56) References Cited

U.S. PATENT DOCUMENTS

| | | | | | |
|---|---|---|---|---|---|
| 3,354,616 | A | * | 11/1967 | Lucas | 95/273 |
| 4,198,221 | A | * | 4/1980 | Catlin et al. | 55/481 |
| 4,334,896 | A | * | 6/1982 | Muller | 95/273 |
| 4,450,964 | A | * | 5/1984 | Wood | 206/527 |
| 4,521,234 | A | * | 6/1985 | Peebles et al. | 55/481 |
| 4,560,396 | A | * | 12/1985 | O'Dell | 55/287 |
| 4,662,309 | A | * | 5/1987 | Mulder | 118/312 |
| 4,773,922 | A | * | 9/1988 | Ross et al. | 55/481 |
| 4,778,496 | A | * | 10/1988 | Conrad | 55/472 |
| 5,281,246 | A | * | 1/1994 | Ray et al. | 55/302 |
| 5,356,597 | A | * | 10/1994 | Wright et al. | 422/169 |
| 5,433,763 | A | * | 7/1995 | Shagott et al. | 55/323 |
| 5,450,982 | A | | 9/1995 | Van Den Oever | |
| 5,853,441 | A | * | 12/1998 | Groen et al. | 55/350.1 |
| 6,063,164 | A | * | 5/2000 | Mergy et al. | 95/212 |
| 6,364,923 | B1 | * | 4/2002 | Wiedmeyer et al. | 55/385.2 |
| 6,402,613 | B1 | * | 6/2002 | Teagle | 454/195 |
| 6,578,259 | B2 | | 6/2003 | Duckett | |
| 6,766,636 | B2 | | 7/2004 | Shingu et al. | |
| 7,186,290 | B2 | * | 3/2007 | Sheehan et al. | 95/277 |
| 7,527,674 | B1 | | 5/2009 | Janawitz et al. | |
| 7,566,354 | B2 | * | 7/2009 | Ryan et al. | 55/385.1 |
| 7,662,198 | B2 | * | 2/2010 | Jansen et al. | 55/337 |
| 7,695,551 | B2 | | 4/2010 | Janawitz et al. | |
| 7,776,122 | B2 | * | 8/2010 | Feldmann | 55/481 |
| 2002/0020160 | A1 | * | 2/2002 | Moore | 55/484 |
| 2009/0282837 | A1 | * | 11/2009 | Yamanaka et al. | 60/785 |
| 2011/0083419 | A1 | * | 4/2011 | Upadhyay et al. | 60/264 |
| 2011/0277441 | A1 | * | 11/2011 | Ayshford | 60/39.092 |
| 2011/0299973 | A1 | * | 12/2011 | Zhang et al. | 415/121.2 |

\* cited by examiner

*Primary Examiner* — Duane Smith
*Assistant Examiner* — Minh-Chau Pham
(74) *Attorney, Agent, or Firm* — Reinhart Boerner Van Deuren P.C.

(57) ABSTRACT

A method of assembling a filter replacement assembly for use with a gas turbine engine. The method includes coupling a first container to a filter wall that is included in an inlet air treatment system. The first container defines a first cavity that is sized to receive at least one filter. A second container is coupled to the first container. The second container defines a second cavity that is sized to receive the at least one filter therein.

26 Claims, 4 Drawing Sheets

METHOD AND APPARATUS FOR AN AIR FILTER CARTRIDGE REPLACEMENT ASSEMBLY

BACKGROUND OF THE INVENTION

The present invention relates generally to inlet air treatment systems, and more specifically to a method and apparatus for an air filter cartridge replacement assembly used with gas turbine engines.

At least some known gas turbine engines include a compressor section, a combustor section, and at least one turbine section. The compressor compresses air, which is mixed with fuel and channeled to the combustor. The compressor compresses air that is mixed with fuel and channeled to the combustor. The mixture is then ignited generating hot combustion gases that are channeled towards the turbine. The turbine extracts energy from the combustion gases for powering the compressor, as well as producing useful work to power a load, such as an electrical generator, or to propel an aircraft in flight.

At least some known turbine engine systems include inlet air treatment systems that remove moisture and/or dust from air channeled to the compressor. Moreover, at least some known inlet air filtration systems include pre-filters that remove moisture from intake air, and final filters that remove dust and debris from intake air. During normal operating conditions, it is desired to have the inlet air treatment system channel filtered air to the compressor with minimal air disruption and pressure drop through the inlet air treatment system. However, over time, as dirt and/or moisture accumulate, the pressure drop across the pre-filters and filter may increase. The increased pressure drop may result in reducing an amount of air flow to the compressor and reducing the operating efficiency of the gas turbine engine. In some instances, the reduced air flow may cause a compressor surge that may damage the compressor. To prevent compressor surges, in at least some known inlet air treatment systems, the filters are removed and/or periodically manually cleaned. This removal process may require shutdown of the gas turbine engine for a period of 3 to 4 days.

BRIEF DESCRIPTION OF THE INVENTION

In one embodiment, a method of assembling a filter replacement assembly for use with a gas turbine engine is provided. The method includes coupling a first container to a filter wall that is included in an inlet air treatment system. The first container defines a first cavity that is sized to receive at least one filter. A second container is coupled to the first container. The second container defines a second cavity that is sized to receive the at least one filter therein.

In another embodiment, a filter replacement assembly for use with a turbine engine system is provided. The turbine engine includes an inlet air treatment system. The air filter assembly includes at least one filter coupled to a filter wall. The filter replacement assembly includes a first container that is coupled to the filter wall. The first container includes an inner surface that defines a first cavity that is sized to receive at least one filter. A second container is coupled to the first container. The second container defines a second cavity that is sized to receive the at least one filter therein.

In yet another embodiment, a gas turbine engine system is provided. The gas turbine engine system includes a compressor and a combustor that is coupled in flow communication with the compressor to receive at least some of the air discharged by the compressor. An inlet air treatment system is coupled in flow communication with the compressor. The inlet air treatment system includes at least one filter that is coupled to a filter wall. A filter replacement assembly is coupled to the inlet air treatment system. The filter replacement assembly includes a first container that is coupled to the filter wall. The first container includes an inner surface that defines a first cavity that is sized to receive at least one filter. A second container is coupled to the first container. The second container defines a second cavity that is sized to receive the at least one filter therein.

DETAILED DESCRIPTION OF THE INVENTION

The exemplary methods and systems described herein overcome the disadvantages of known inlet air treatment systems by providing a pre-filter bypass assembly that enables an inlet air filter to be removed from operation without requiring a shutdown of the associated turbine engine. More specifically, the embodiments described herein enables a filter to be selectively isolated, removed, and replaced with a filter replacement assembly during operating periods when the pressure drop through the inlet air treatment system causes a reduction in the compressor operating efficiency and/or causes a compressor surge that may damage the compressor. More specifically, the filter replacement assembly includes at least a first container and a second container, where the filter is selectively isolated in the first container when the filter replacement assembly is coupled to a filter wall. The filter assembly may be selectively uncoupled from the filter wall after the filter has been moved from the first container to the second container.

Figure 1:
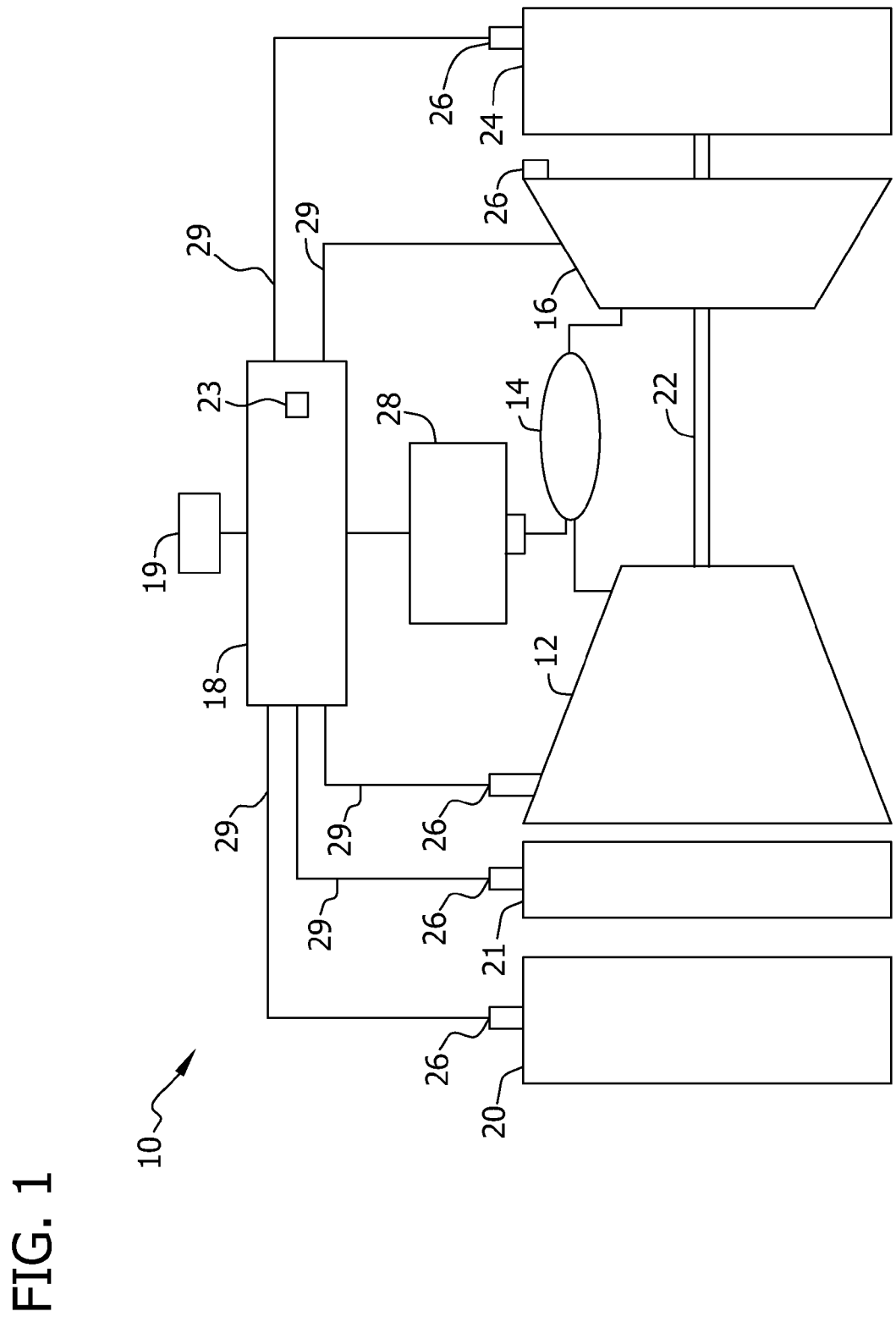
FIG. 1 is a schematic illustration of an exemplary known gas turbine engine system.

FIG. 1 is a schematic diagram of a gas turbine engine system 10. In the exemplary embodiment, gas turbine engine system 10 includes an inlet air treatment system 20, a compressor 12, a combustor 14, a turbine 16 rotatably coupled to compressor 12 via a rotor shaft 22, a control system or controller 18, and a fuel control assembly 28. Combustor 14 is coupled to compressor 12 such that combustor 14 is in flow communication with compressor 12. Fuel control assembly 28 is coupled to combustor 14 and channels fuel into combustor 14. Inlet air treatment system 20 channels filtered air to compressor 12. In one embodiment, injected water and/or other humidifying agents are also channeled to compressor 12 through inlet air treatment system 20. Inlet air treatment system 20 may include multiple ducts, filters, screens and/or sound-absorbing devices that contribute to pressure losses of ambient air flowing through inlet air treatment system 20 into one or more inlet guide vanes 21 of compressor 12.

During operation, inlet air treatment system 20 channels filtered ambient air towards compressor 12 to be compressed to a higher pressure. Compressor 12 discharges compressed air towards combustor 14 wherein it is mixed with fuel and ignited to generate combustion gases that flow to turbine 16. Rotation of turbine 16 drives compressor 12. Turbine 16 converts gas stream thermal energy from the combustion gases to mechanical rotational energy. In the exemplary embodiment, gas turbine engine system 10 may be used to drive a load 24, such as a generator, which may be coupled to rotor shaft 22.

During operation, gas turbine engine system 10 is monitored by several sensors 26 that detect various operating conditions of turbine 16, generator 24, and/or ambient environment. For example, pressure sensors 26 may monitor ambient pressure and/or static and dynamic pressure levels at inlet air treatment system 20 and/or at any other location in a flow path defined within gas turbine engine system 10. Specifically, in the exemplary embodiment, temperature sensors 26 measure ambient air temperature at inlet air treatment system 20. Other sensors 26 may include, but are not limited to only including, flow sensors, speed sensors, flame detector sensors, valve position sensors, guide vane angle sensors, and/or other sensors that sense various parameters relative to the operation of gas turbine engine system 10. As used herein, the term "parameters" refers to physical properties whose values can be used to define the operating conditions of gas turbine engine system 10, such as temperatures, pressures, and gas flows at defined locations.

In the exemplary embodiment, control system 18 communicates with sensors 26 via communication links 29 that may be implemented in hardware and/or software. In one embodiment, communication links 29 remotely communicate data signals to and from control system 18 in accordance with any wired or wireless communication protocol known to one of ordinary skill in the art guided by the teachings herein. Such data signals may include signals indicative of operating conditions of sensors 26 transmitted to the control system 18 and various command signals communicated by control system 18 to sensors 26.

Control system 18 may be a computer system that includes a display 19 and at least one processor 23. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels. Control system 18 executes programs to control the operation of gas turbine engine system 10 based on sensor inputs and instructions from human operators. Programs executed by control system 18 may include, for example, control algorithms for operating gas turbine engine system 10. User input functionality is provided in display 19, which acts as a user input selection device. In the exemplary embodiment, display 19 is responsive to the user pressing contact on display 19 to selectively perform functionality. Display 19 may also include a keypad which operates in a conventional well known manner. Thus, the user can input desired operational functions available with control system 18 by contacting a surface of display 19. Commands generated by control system 18 cause gas sensors 26 to monitor the ambient environment and to activate other control settings on gas turbine engine system 10.

In the embodiments described herein, memory may include, without limitation, a computer-readable medium, such as a random access memory (RAM), and a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, gas turbine engine system control commands. The execution of sequences of instructions is not limited to any specific combination of hardware circuitry and software instructions.

Figure 2:
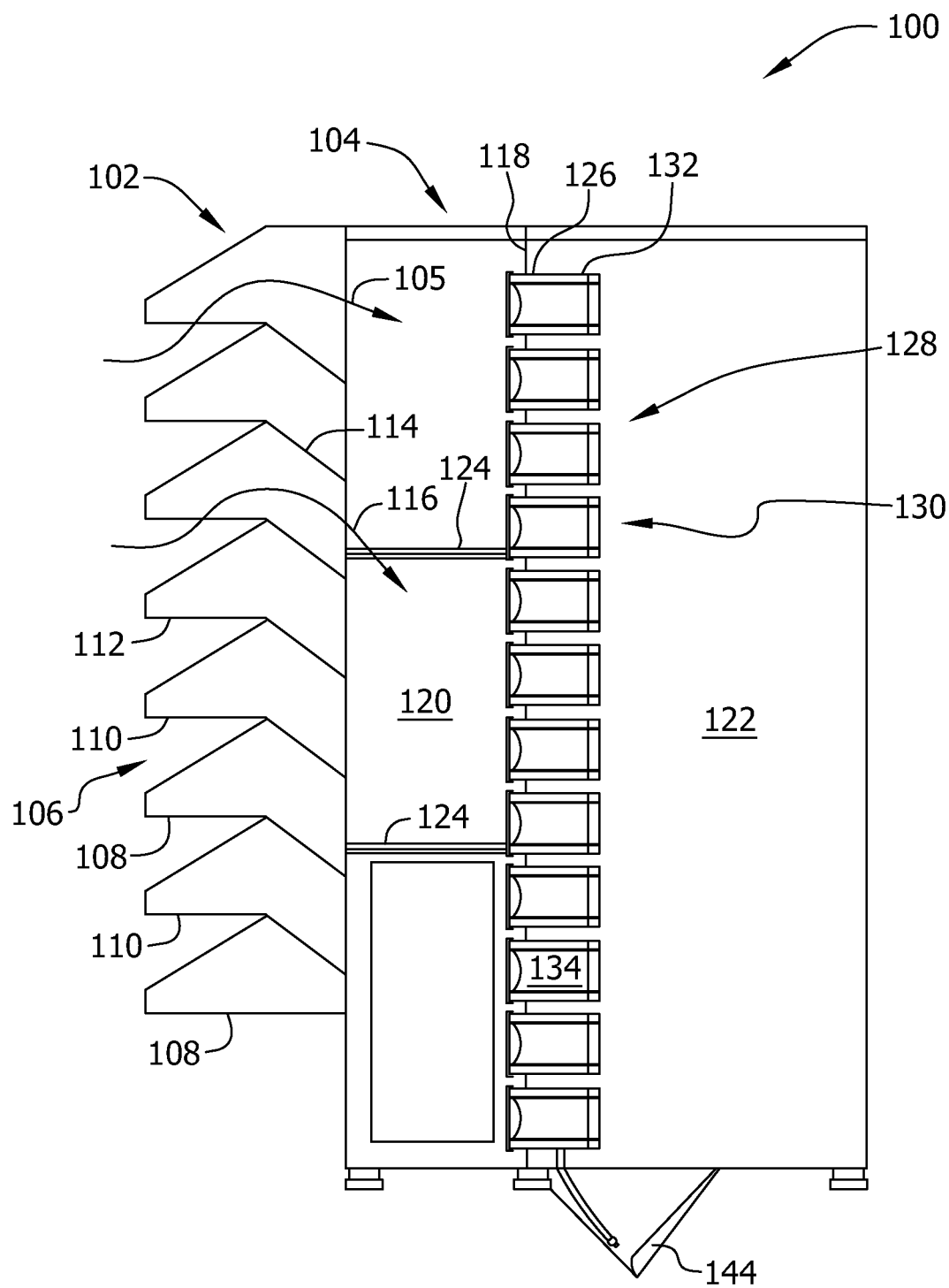
FIG. 2 is a schematic view of an exemplary inlet air treatment system that may be used with the turbine engine shown in FIG. 1.

FIG. 2 is a schematic view of an exemplary inlet air treatment system 100 that may be used with gas turbine engine system 10 (shown in FIG. 1). In the exemplary embodiment, inlet air treatment system 100 includes an inlet hood assembly 102 that is coupled in flow communication with an air filter enclosure 104 such that an airflow path 105 is defined between inlet hood assembly 102 and air filter enclosure 104. Moreover, in the exemplary embodiment, inlet hood assembly 102 includes a plurality of vertically-spaced inlet hoods 106. More specifically, in the exemplary embodiment, each inlet hood 106 includes an air inlet opening 108, a pre-filter 110, and a deflector plate 114. Each pre-filter 110 is positioned within inlet opening 108 to facilitate filtering air flow 116 channeled through inlet opening 108 into air filter enclosure 104. As air flow 116 is channeled through inlet hood 106, deflector plate 114 directs air flow 116 downwardly into air filter enclosure 104.

In the exemplary embodiment, air filter enclosure 104 includes a filter wall 118 within air filter enclosure 104 that divides enclosure 104 into an air filter chamber 120 and a clean air chamber 122. A plurality of access walkways 124 extend between filter wall 118 and air filter enclosure 104 to provide access to filter wall 118. A plurality of apertures 126 extend through filter wall 118 to couple air filter chamber 120 in flow communication with clean air chamber 122. A filter assembly 128 positioned within air filter chamber 120 is coupled to filter wall 118 and is in flow communication with apertures 126.

Filter assembly 128 includes a plurality of filter cartridges 130 that are each coupled to filter wall 118 such that each filter cartridge 130 is at least partially inserted within a corresponding aperture 126. Moreover, in the exemplary embodiment, filter cartridge 130 includes a rectangular-shaped filter membrane 132 that includes a filtered air channel 134 defined therein. Alternatively, filter cartridge 130 includes a tubular-shaped filter membrane 132. In the exemplary embodiment, each filter cartridge 130 is coupled to filter wall 118 such that filtered air channel 134 is in flow communication with clean air chamber 122 via apertures 126. A debris collection hopper 144 that is coupled in flow communication with air filter chamber 120 collects debris entering air filter chamber 120 from inlet hood assembly 102.

During operation, inlet hood assembly 102 channels air through airflow path 105 into air filter chamber 120. As air flow 116 enters inlet hood assembly 102, pre-filter 110 facilitates removing moisture from air flow 116. Air flow 116 passing through pre-filter 110 impinges against deflector plate 114 and is directed downwardly towards debris collection hopper 144. More specifically, as air flow 116 contacts deflector plate 114, debris carried by air flow 116 is gravity fed into debris collection hopper 144. Air flow 116 is then channeled through filter cartridge 130 into filtered air channel 134. Filter cartridge 130 facilitates removing dust and debris carried by air flow 116 such that air entering filtered air channel 134 is substantially free of dust and debris. Air flow 116 is then channeled through apertures 126 into clean air chamber 122 prior to being channeled downstream to compressor 12 (shown in FIG. 1).

Figure 3:
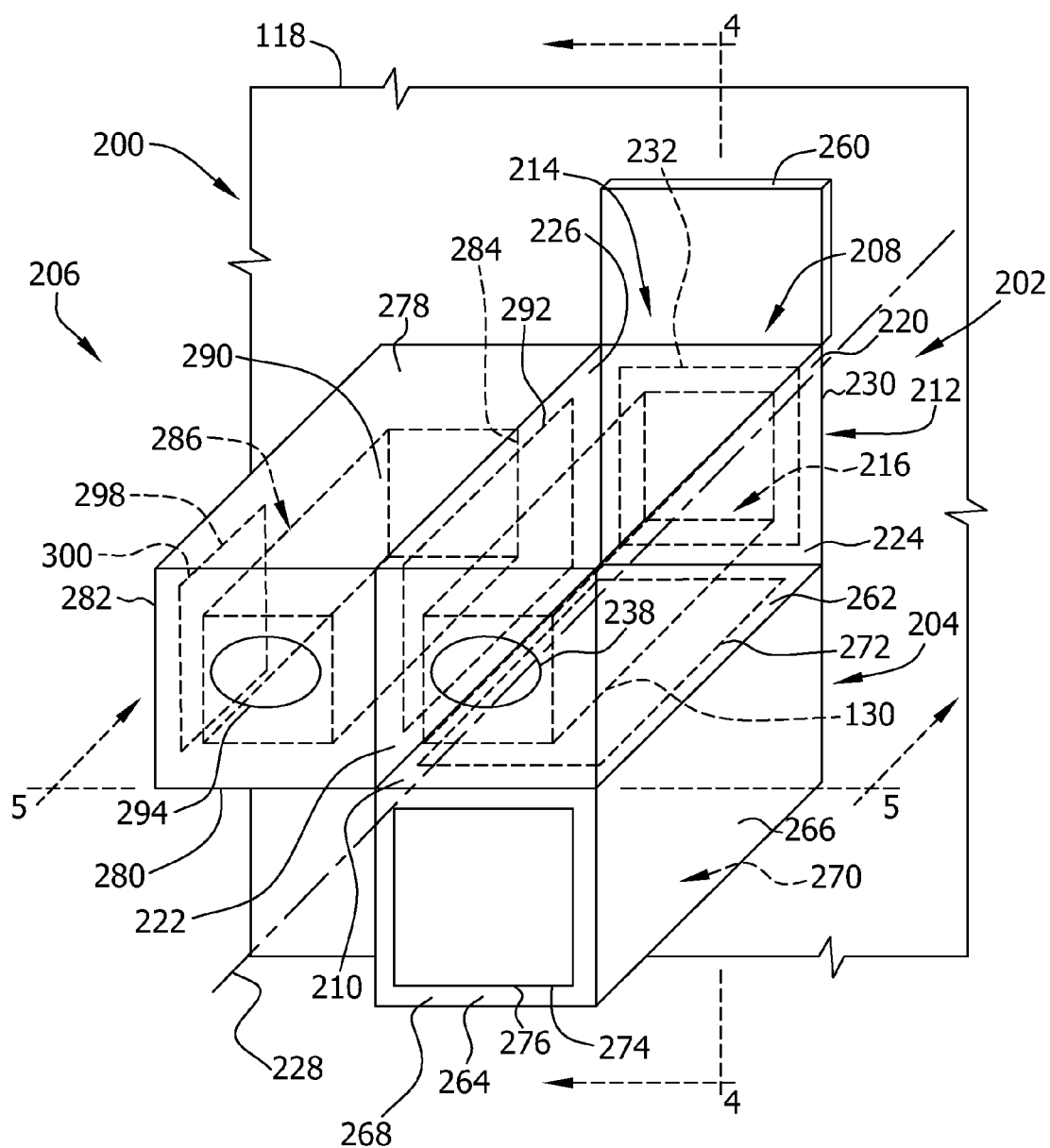
FIG. 3 is a schematic view of an exemplary filter replacement assembly that may be used with the inlet air treatment system shown in FIG. 2.
Figure 4:
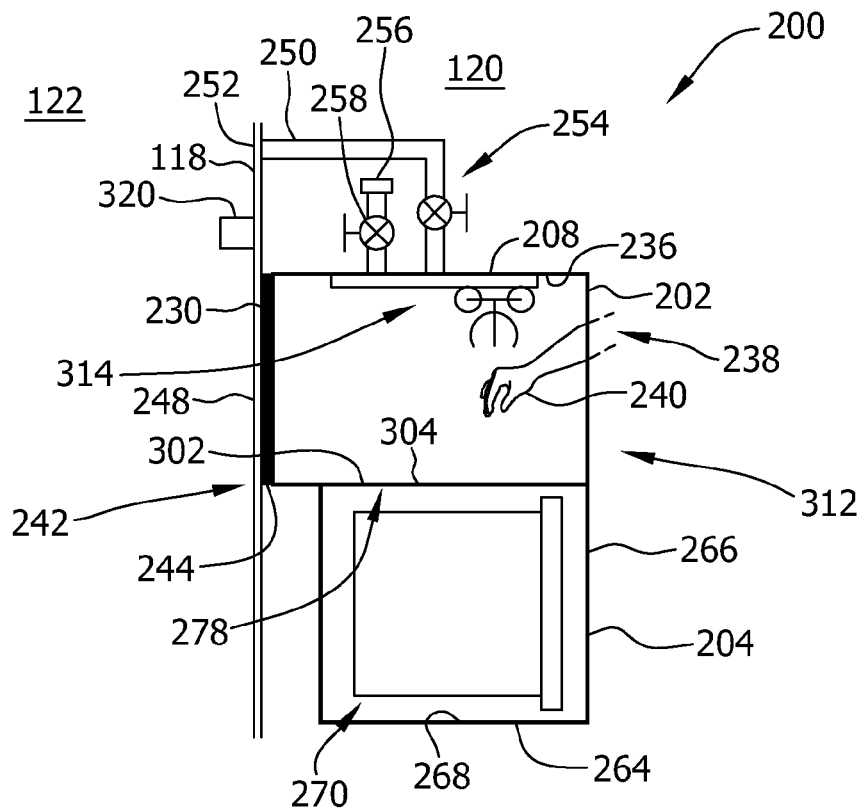
FIG. 4 is a first partial cross-sectional view of the filter replacement assembly shown in FIG. 3.
Figure 5:
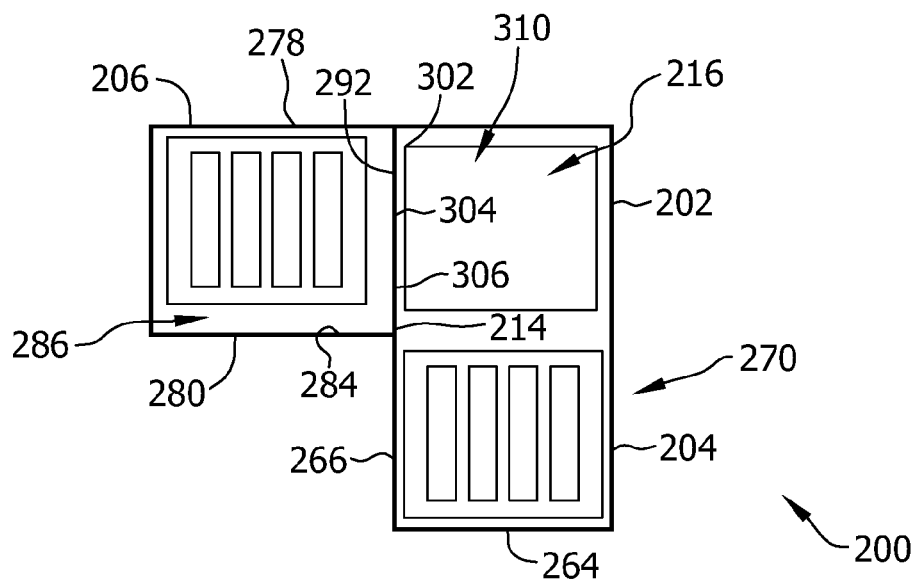
FIG. 5 is a second partial cross-sectional view of the filter replacement assembly shown in FIG. 3.

FIG. 3 is a schematic view of an exemplary filter replacement assembly 200 that may be used with the inlet air treatment system 100. FIG. 4 is a first partial cross-sectional view of filter replacement assembly 200 taken along line 4-4. FIG. 5 is a second partial cross-sectional view of filter replacement assembly 200 taken along line 5-5. Identical components illustrated in FIGS. 3-5 are labeled with the same reference numbers used in FIG. 2. In the exemplary embodiment, filter replacement assembly 200 includes a first or operating filter container 202, a second or dirty filter container 204 that is coupled to operating filter container 202, and a third or clean filter container 206 that is coupled to operating filter container 202. Operating filter container 202 includes an upper surface 208, a bottom surface 210 that is opposite upper surface 208, and at least one sidewall 212 that extends between surfaces 208 and 210 to form container 202. In the exemplary embodiment, container 202 includes an inner surface 214 that defines a cavity 216 therein that is sized and shaped to receive at least one filter cartridge 130 (shown in FIG. 2). In one embodiment, cavity 216 is sized and shaped to at least partially encapsulate at least one filter cartridge 130 therein. In an alternative embodiment, cavity 216 is sized and shaped to contain a plurality of filter cartridges 130 therein.

In the exemplary embodiment, sidewall 212 includes a front wall 220, a back wall 222 that is opposite front wall 220, a first sidewall 224, and a second sidewall 226 that is opposite first sidewall 224. A longitudinal axis 228 of operating filter container 202 extends between front wall 220 and back wall 222. Back wall 222 includes an outer surface 230 that is coupled to filter wall 118. At least one first opening 232 extends through back wall 222. Opening 232 is sized to receive filter cartridge 130 therethrough. Operating filter container 202 is positioned relative to filter cartridge 130 such that operating filter container 202 encapsulates filter cartridge 130 coupled to filter wall 118. In an alternative embodiment, sidewall 212 includes an adjustable inner surface 236 that is selectively moveable i.e., telescoping, in a direction that is substantially parallel to longitudinal axis 228 to accommodate a full length (not shown) of filter cartridge 130. In the exemplary embodiment, at least one second opening 238 is defined in sidewall 212 to provide access to cavity 216 and to enable removal of filter cartridge 130. At least one flexible glove 240 is coupled to second opening 238 such that glove 240 within cavity 216 to enable removal of filter cartridge 130 and to facilitate preventing air from entering cavity 216 via second opening 238.

In the exemplary embodiment, operating filter container 202 is positioned at or adjacent to filter wall 118 such that filter cartridge 130 is at least partially positioned within cavity 216 and is inserted through first opening 232. Outer surface 230 is positioned adjacent to filter wall 118 to facilitate isolating cavity 216 from air filter chamber 120 and to facilitate preventing air from being channeled into cavity 216 from air filter chamber 120. Operating filter container 202 includes a sealing assembly 242 that extends between outer surface 230 and filter wall 118 to facilitate coupling operating filter container 202 to filter wall 118 and to facilitate substantially preventing air from being channeled into cavity 216 from air filter chamber 120. Sealing assembly 242 is positioned circumferentially about filter aperture 126. In one embodiment, sealing assembly 242 includes a flexible conduit 244 and a pump (not shown) that enables a fluid to be channeled into conduit 244. Moreover, in such an embodiment, a cross-sectional thickness (not shown) of conduit 244 increases to form a substantially air-tight seal between outer surface 230 and filter wall 118. In the exemplary embodiment, sealing assembly 242 includes a sealing material 248 that extends between outer surface 230 and filter wall 118 to facilitate sealing cavity 216 from air filter chamber 120 such that a vacuum pressure is formed within cavity 216. Alternative, sealing assembly 242 does not include sealing material 248.

In the exemplary embodiment, filter replacement assembly 200 includes a by-pass conduit 250 that extends between operating filter container 202 and a by-pass opening 252 defined within filter wall 118. By-pass conduit 250 is coupled in flow communication between cavity 216 and clean air chamber 122 and channels a flow of filtered air from clean air chamber 122 into cavity 216 to facilitate reducing a differential pressure across filter cartridge 130 and to enable filter cartridge 130 to be removed from aperture 126. A flow control valve 254 is coupled to by-pass conduit 250 between operating filter container 202 and clean air chamber 122 to selectively channel filtered air from clean air chamber 122 into cavity 216. In the exemplary embodiment, by-pass conduit 250 is coupled to upper surface 208. In an alternative embodiment, by-pass conduit 250 may be coupled to front wall 220, first sidewall 224, second sidewall 226, and/or any location within operating filter container 202 that enables filter replacement assembly 200 to function as described herein. Moreover, in another alternative embodiment, filter replacement assembly 200 includes a vacuum release valve 256 that is coupled to operating filter container 202 to channel air from air filter chamber 120 into cavity 216 to facilitate reducing a vacuum pressure formed within cavity 216. Vacuum release valve 256 includes a filter 258 that is coupled between air filter chamber 120 and operating filter container 202 to facilitate preventing debris and dust from air entering cavity 216.

In one embodiment, filter replacement assembly 200 includes a hatch 260 that is removably coupled to operating filter container 202. Hatch 260 is mounted to filter wall 118 such that hatch 260 substantially covers aperture 126 when filter cartridge 130 is removed from aperture 126 to facilitate preventing air being channeled from air filter chamber 120 to flow into air chamber 122 through aperture 126. Hatch 260 is removably coupled to back wall 222, and more specifically, is slidably coupled between operating filter container 202 and filter wall 118 to enable aperture 126 to be substantially covered and to isolate clean air chamber 122 from cavity 216 and air filter chamber 120 to enable operating filter cartridge 130 to be removed from filter wall 118.

In the exemplary embodiment, dirty filter container 204 includes an upper surface 262, a bottom surface 264 that is opposite upper surface 262, and at least one sidewall 266 that extends between upper surface 262 and bottom surface 264 to form dirty filter container 204. Dirty filter container 204 includes an inner surface 268 that defines a dirty filter cavity 270 that is sized and shaped to receive at least one filter cartridge 130 therein. In the exemplary embodiment, an opening 272 extends through bottom surface 210 of operating filter container 202 and through upper surface 262 of dirty filter container 204, such that operating filter container cavity 216 is coupled in flow communication with dirty filter cavity 270 via opening 272. Opening 272 is sized to receive at least one filter cartridge 130 therethrough such that filter cartridge 130 is selectively movable between operating filter cavity 216 and dirty filter cavity 270.

In one embodiment, dirty filter container 204 includes an access hatch 274 that is removably coupled to sidewall 266 to selectively provide access through an opening 276 defined in sidewall 266. Opening 276 is sized to receive at least one filter cartridge 130 therethrough and to provide access to dirty filter cavity 270 to enable filter cartridge 130 to be selectively removed from dirty filter container 204. Hatch 274 is sized to substantially cover opening 276 to at least partially prevent air from being channeled to dirty filter cavity 270 from air filter chamber 120 through opening 276.

In the exemplary embodiment, clean filter container 206 includes an upper surface 278, a bottom surface 280 that is opposite upper surface 278, and at least one sidewall 282 that extends between upper surface 278 and bottom surface 280 to form clean filter container 206. Clean filter container 206 includes an inner surface 284 that defines a clean filter cavity 286 that is sized and shaped to receive replacement filter cartridge 290 therein. In the exemplary embodiment, an opening 292 extends through sidewall 212 of operating filter container 202 and through sidewall 282 of clean filter container 206 to coupled filter container cavity 216 in flow communication with clean filter cavity 286. Opening 292 is sized to receive at least one replacement filter cartridge 290 therethrough such that replacement filter cartridge 290 is selectively movable between clean filter cavity 286 and operating filter cavity 216.

In the exemplary embodiment, clean filter container 206 includes at least one second opening 294 defined in sidewall 282 to provide access to clean filter cavity 286 and to enable replacement filter cartridge 290 to be selectively moved from clean filter cavity 286 to operating filter container cavity 216. A second flexible glove (not shown) is coupled to second opening 294 within clean filter cavity 286 to enable replacement filter cartridge 290 to be moved and to prevent air from entering clean filter cavity 286 via second opening 294.

In one embodiment, clean filter container 206 includes an access hatch 298 that is removably coupled to sidewall 282 to selectively provide access through an opening 300 defined in sidewall 282. Opening 300 is sized to receive at least one replacement filter cartridge 290 therethrough and to provide access to clean filter cavity 286 to enable replacement filter cartridge 290 to be selectively positioned within clean filter container 206. Hatch 298 is sized to substantially cover opening 300 to at least partially prevent air from being channeled towards filter cavity 286 from air filter chamber 120 via opening 300.

In the exemplary embodiment, filter replacement assembly 200 includes a door 302 coupled to filter container inner surface 214 to selectively isolate operating filter container cavity 216 from dirty filter cavity 270 and clean filter cavity 286. Door 302 is coupled to inner surface 214 such that door 302 is positionable between a first position 310 and a second position 312. In first position 310, door sidewall 304 substantially covers opening 292 such that clean filter cavity 286 is substantially isolated from operating filter container cavity 216, and dirty filter cavity 270 is in flow communication with operating filter container cavity 216 via opening 272. In second position 312, door sidewall 304 substantially covers opening 272 such that dirty filter cavity 270 is substantially isolated from operating filter container cavity 216, and clean filter cavity 286 is in flow communication with operating filter container cavity 216 via opening 292.

In an alternative embodiment, filter replacement assembly 200 includes a handling assembly 314 coupled to filter container inner surface 214. Handling assembly 314 is configured to facilitate removing filter cartridge 130 from aperture 126 and positioning filter cartridge 130 into dirty filter cavity 270. Handling assembly 314 is further configured to move replacement filter cartridge 290 from clean filter cavity 286 to operating filter container cavity 216, and position replacement filter cartridge 290 within aperture 126.

In the exemplary embodiment, filter replacement assembly 200 includes at least one differential pressure sensor 320 that is removably coupled to filter cartridge 130 and/or filter wall 118 for sensing a pressure drop in air flow filter cartridge 130. Differential pressure sensor 320 is configured to transmit at least one signal indicative of a sensed pressure drop. Control system 18 is coupled to differential pressure sensor 320 for receiving the signal from differential pressure sensor 320 that is indicative of a differential pressure across filter cartridge 130. During operation of inlet air treatment system 100, air flow 116 enters inlet hood assembly 102 and is channeled towards air filter chamber 120. As air flow 116 flows through filter cartridge 130, dust and debris carried by air flow 116 accumulates on filter cartridge 130 such that the flow path through filter cartridge 130 becomes restricted. Such restrictions result in an increased loss in air pressure across filter cartridge 130. Differential pressure sensor 320 monitors the pressure drop across filter cartridge 130. When a pressure drop across filter cartridge 130 reaches a predetermined level, differential pressure sensor 320 transmits a signal to control system 18. Control system 18 is configured to calculate a filter performance value (i.e., a value indicative of a differential pressure through a filter cartridge) based on each received signal. Control system 18 is further configured to compare the calculated filter performance with a predefined filter performance of filter cartridge 130 and to transmit a notification signal to display 19 upon determining the calculated filter performance is different than the predefined filter performance. Display 19 is configured to display a notification to a user that identifies a filter cartridge 130 that requires replacement.

The above-described systems and methods enable an intake air filter to be removed from operation without requiring a shutdown of the associated turbine engine. More specifically, the embodiments described herein include a filter replacement assembly that enables selectively isolating, removing, and replacing the air intake filter without requiring a shutdown of the associated turbine engine. In addition, the embodiments described herein provide a filter replacement assembly that selectively prevents a flow of unfiltered air from entering a gas turbine engine during filter replacement. As such, the cost of maintaining the gas turbine engine system is facilitated to be reduced.

Exemplary embodiments of systems and methods for bypassing an inlet air treatment filter are described above in detail. The systems and methods are not limited to the specific embodiments described herein, but rather, components of systems and/or steps of the method may be utilized independently and separately from other components and/or steps described herein. For example, the systems and method may also be used in combination with other air treatment systems and methods, and are not limited to practice with only the gas turbine engine system as described herein. Rather, the exemplary embodiment can be implemented and utilized in connection with many other combustion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a filter replacement assembly for use with a gas turbine engine, the filter replacement assembly configured to replace at least one filter coupled to a filter wall in an inlet air treatment system, said method comprising:
    coupling a first container to the filter wall, wherein the first container defines a first cavity sized to receive the at least one filter therein; and
    coupling a second container to the first container, wherein the second container defines a second cavity sized to receive the at least one filter therein, wherein the first and second containers are sized to enable the at least one filter to be selectively moveable therebetween based on an operational status of the at least one filter, wherein the first container is configured to be selectively uncoupled from the filter wall after the at least one filter has been moved from the first container to the second container.

2. A method in accordance with claim 1, further comprising coupling a third container to the first container, wherein the third container defines a third cavity that is sized to receive a replacement filter therein, the first cavity being connected to the second cavity and the third cavity, the second and third cavities being offset from the first cavity such that spent filter may be located within the second cavity while the replacement filter may be transitioned between the first and third cavities without allowing fluid bypass through the first, second and third cavities.

3. A method in accordance with claim 2, further comprising coupling a door to an inner surface of the first container, wherein the door selectively isolates the first cavity from the second cavity and from the third cavity.

4. A method in accordance with claim 1, further comprising coupling a sealing assembly to an outer surface of the first container.

5. A method in accordance with claim 1, further comprising coupling a by-pass conduit between the first container and the filter wall.

6. A method in accordance with claim 1, further comprising:
    coupling at least one sensor to the at least one filter for use in sensing a pressure in the at least one filter; and
    coupling a control system to the at least one sensor for receiving a signal from the at least one sensor indicative of the sensed pressure, wherein the control system calculates a performance of the at least one filter based on the received signal.

7. A filter replacement assembly for use with a turbine engine system that includes an inlet air treatment system, wherein the inlet air treatment system includes at least one filter coupled to a filter wall, said filter replacement assembly comprising:
    a first container coupled to the filter wall, said first container comprising an inner surface that defines a first cavity sized to receive the at least one filter therein; and
    a second container coupled to said first container, said second container defines a second cavity sized to receive the at least one filter therein, wherein the first and second containers are sized to enable the at least one filter to be selectively moveable therebetween based on an operational status of the at least one filter, wherein said first container is configured to be selectively uncoupled from the filter wall after the at least one filter has been moved from said first container to said second container.

8. A filter replacement assembly for use in replacing at least one filter coupled to a filter wall of an inlet air treatment system of a turbine engine system, said filter replacement assembly comprising:
    a first container coupled to the filter wall, said first container comprising an inner surface that defines a first cavity including the at least one filter received therein;
    a second container coupled to said first container, said second container defines a second cavity sized to receive the at least one filter therein, wherein the at least one filter is selectively moveable between said first and said second containers based on an operational status of the at least one filter;
    a third container coupled to said first container, said third container defines a third cavity sized to receive a replacement filter therein; and
    the first cavity being connected to the second cavity and the third cavity, the second cavity and third cavity being offset from the first cavity such the replacement filter may be transitioned between the first and third cavities while the at least one filter is located within the second cavity.

9. A filter replacement assembly in accordance with claim 8, further comprising a door coupled to said first container inner surface for use in selectively isolating said first cavity from said second cavity and from said third cavity.

10. A filter replacement assembly in accordance with claim 7, wherein said first container inner surface is selectively moveable in a direction that is substantially parallel to a longitudinal axis of the at least one filter.

11. A filter replacement assembly in accordance with claim 7, further comprising a sealing assembly coupled to an outer surface of said first container.

12. A filter replacement assembly in accordance with claim 7, further comprising a by-pass conduit coupled between said first container and the filter wall.

13. A filter replacement assembly in accordance with claim 7, further comprising a valve coupled to said first container to facilitate reducing a vacuum formed within said filter replacement assembly.

14. A filter replacement assembly in accordance with claim 7, further comprising:
    at least one sensor for use in sensing a pressure in the at least one filter; and
    a control system coupled to said at least one sensor for receiving a signal from said at least one sensor indicative of the sensed pressure, said control system configured to calculate a performance of the at least one filter based on the received signal.

15. A gas turbine engine system comprising:
    a compressor;

a combustor coupled in flow communication with said compressor to receive at least some of the air discharged by said compressor;

an inlet air treatment system coupled in flow communication with said compressor, said inlet air treatment system comprising at least one filter coupled adjacent to an aperture through a filter wall to prevent dirty fluid bypass through the aperture; and a filter replacement assembly coupled to said inlet air treatment system adjacent the at least one filter and the aperture, said filter replacement assembly comprising:

a first container coupled to said filter wall, said first container comprising an inner surface that defines a first cavity sized to receive the at least one filter therein when removed from the filter wall; and a second container coupled to said first container, said second container defines a second cavity sized to receive said at least one filter therein, wherein the first and second cavities are connected and sized to enable the at least one filter to be moved therebetween based on an operational status of the at least one filter, wherein said first container is configured to be selectively uncoupled from the filter wall after the at least one filter has been moved from said first container to said second container.

16. A gas turbine engine in accordance with claim 15, wherein said filter replacement assembly further comprises a third container coupled to said first container, said third container defines a third cavity sized to receive a replacement filter therein, the third cavity is connected to the first cavity such that the replacement filter can be moved from the third cavity through the first cavity and coupled to the filter wall adjacent the aperture while the at least one filter is located within the second cavity without allowing fluid bypass through the filter replacement assembly with the compressor and combustor operational.

17. A gas turbine engine in accordance with claim 16, wherein said filter replacement assembly further comprises a door coupled to said first container inner surface for use in selectively isolating said first cavity from said second cavity and from said third cavity.

18. A gas turbine engine in accordance with claim 15, wherein said filter replacement assembly further comprises a sealing assembly coupled to an outer surface of said first container.

19. A gas turbine engine in accordance with claim 15, wherein said filter replacement assembly further comprises a by-pass conduit coupled between said first container and the filter wall.

20. A gas turbine engine in accordance with claim 15, further comprising:

at least one sensor for use in sensing a pressure in said at least one filter; and a control system coupled to said at least one sensor for receiving a signal from said at least one sensor indicative of the sensed pressure, said control system configured to calculate a performance of said at least one filter based on the received signal.

21. A method of replacing a first filter mounted to an aperture in a filter wall in an inlet air treatment system of a gas turbine engine with a replacement filter, the method comprising:

coupling a filter replacement assembly to the filter wall, the filter replacement assembly having a first cavity, a second cavity, and a third cavity that are interconnected with one another, each of the second and third cavities being adjacent to the third cavity, wherein coupling of the filter replacement assembly aligns the first cavity with the aperture;

removing the first filter from the filter wall and transitioning the first filter into the first cavity;

transitioning the first filter from the first cavity to the second cavity; and mounting the replacement filter to the aperture in the filter wall by transitioning the replacement filter from the third cavity through the first cavity.

22. The method of claim 21, wherein the steps of removing the first filter and mounting the replacement filter occur while the gas turbine engine is operating and the filter replacement assembly prevents dirty fluid from passing through the inlet air treatment system to the gas turbine engine when the first filter is removed from the filter wall.

23. The method of claim 21, wherein the step of mounting the replacement filter to the aperture in the filter wall occurs while the first filter remains in the second cavity.

24. A filter replacement assembly for use in replacing at least one filter of an inlet air treatment system of an turbine engine system when the at least one filter is becomes spent with a replacement filter, the inlet air treatment system includes a filter wall to which the at least one filter is coupled, the filter replacement assembly comprising:

a first container comprising an inner surface that defines a first cavity sized to receive the at least one filter therein when the at least one filter is spent, the first cavity providing access to the at least one filter when the first container is mounted to the filter wall such that the at least one filter can be removed from the filter wall into the first container;

a second container coupled to said first container, said second container defines a second cavity connected to the first cavity such that the at least one filter can be moved from the first cavity to the second cavity after the at least one filter has been removed from the filter wall; and a third container coupled to said first container, said third container defines a third cavity connected to the first cavity such that the replacement can be moved from the third cavity and mounted to the filter wall through the first cavity while the at least one filter that is spent remains within the second cavity.

25. The filter replacement assembly of claim 24, further comprising a mounting interface for mounting to the filter wall;

wherein the first, second and third containers are interconnected to form a housing;

wherein when the housing is mounted to the filter wall with the mounting interface, dirty fluid bypass is prevented when replacing the at least one filter with a replacement filter while the turbine engine system is operational.

26. The filter replacement assembly of claim 24, further comprising the replacement filter.

* * * * *

UNITED STATES PATENT AND TRADEMARK OFFICE
CERTIFICATE OF CORRECTION

PATENT NO.        : 8,721,753 B2
APPLICATION NO.   : 12/777635
DATED             : May 13, 2014
INVENTOR(S)       : Gordon Timothy Ayshford Page 1 of 1

It is certified that error appears in the above-identified patent and that said Letters Patent is hereby corrected as shown below:

In the Claims

In column 9, line 42, insert the word -- a -- so that the line correctly reads -- cavities being offset from the first cavity such that a spent filter --.

Signed and Sealed this
Fifth Day of August, 2014

Michelle K. Lee
*Deputy Director of the United States Patent and Trademark Office*